Dec. 2, 1924.

A. J. SLONECKER

STEERING GEAR INDICATOR

Filed April 12, 1924    2 Sheets-Sheet 1

Inventor
A. J. Slonecker
By C. A. Snow & Co.
Attorney

Patented Dec. 2, 1924.

1,517,760

UNITED STATES PATENT OFFICE.

ABIRAM J. SLONECKER, OF TRENTON, MISSOURI, ASSIGNOR TO SLONECKER PRODUCTS COMPANY, OF TRENTON, MISSOURI.

STEERING-GEAR INDICATOR.

Application filed April 12, 1924. Serial No. 706,217.

*To all whom it may concern:*

Be it known that I, ABIRAM J. SLONECKER, a citizen of the United States, residing at Trenton, in the county of Grundy and State of Missouri, have invented a new and useful Steering-Gear Indicator, of which the following is a specification.

This invention has reference to an indicator especially designed for use in connection with the steering wheels of motor vehicles, the primary object of the invention being to provide an indicating means in full view of the operator of a motor vehicle, which will indicate to the operator the exact angle of the front wheels to facilitate the operation of the motor vehicle when in close places.

Another important object of the invention is to provide means to enable the operator to move the front wheels to a predetermined position prior to starting the vehicle, thereby eliminating the necessity of the operator alighting from the vehicle to ascertain the position of the front wheels.

A still further object of the invention is to provide an indicator which may be viewed by the operator to assist in guiding the vehicle when backing the vehicle long distances.

A still further object of the invention is to provide a device of this character which will be readily and easily installed on the usual steering gear, eliminating the necessity of obtaining the services of a mechanic to apply the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
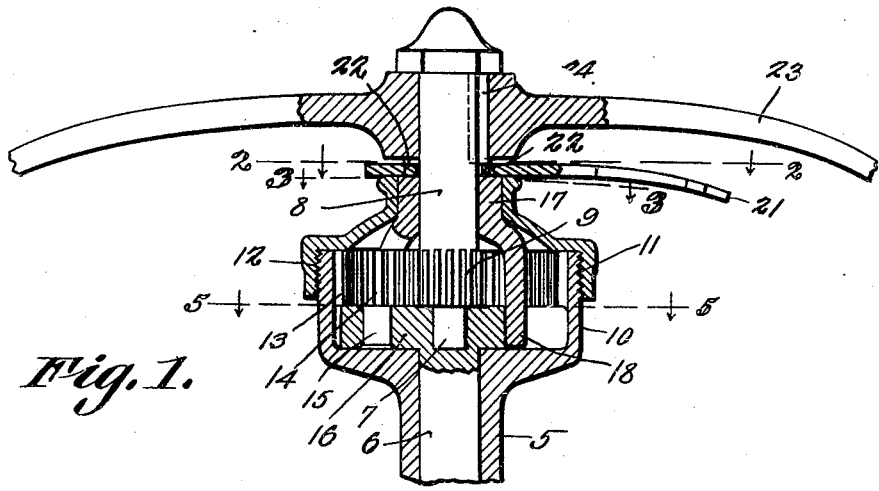
Figure 1 is a fragmental sectional view disclosing the upper portion of a steering gear and wheel.
Figure 2:
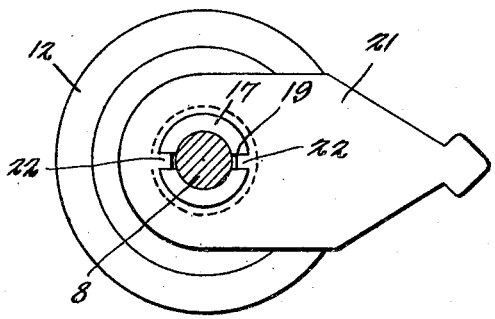
Figure 2 is a sectional view taken on line 2—2 of Figure 1.
Figure 3:
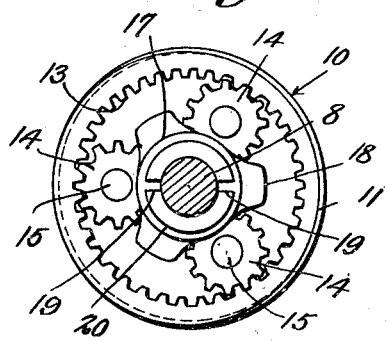
Figure 3 is a sectional view taken on line 3—3 of Figure 1, the cover cap having been removed.
Figure 4:
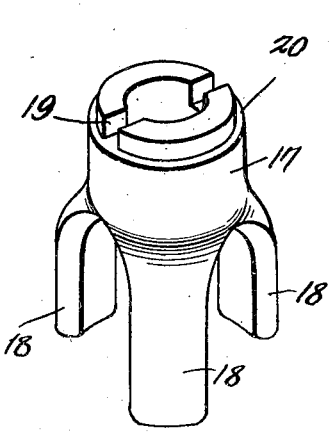
Figure 4 is a perspective view of the operating fingers that connect the indicator with the steering gear.

Referring to the drawings in detail, the reference character 5 indicates the steering column of a well known type of motor vehicle in which is mounted the steering post 6 formed with a socket in its upper extremity to receive the reduced end 7 of the shaft 8 providing a bearing for the shaft 8 that carries gear 9.

As shown, the upper extremity of the steering column 5 is enlarged as at 10 and formed with external threads 11 adapted to cooperate with the threads of the cap 12 that forms the cover for the enlarged portion 10. Teeth 13 are formed internally of the enlarged portion 10 and mesh with the teeth of the pinions 14 that are mounted on shafts 15 extending into the supporting member 16 which is substantially triangular in formation, the side edges thereof being slightly curved.

The pinions 14 also mesh with the gear 9 so that movement of the shaft 8 may be transmitted to the pinions 14 which in turn rotate the supporting member 16 that is secured on the upper end of the steering post, whereupon rotary movement is imparted to the steering post.

The reference character 17 indicates a collar formed with depending fingers 18, which collar is provided with cut out portions 19 formed in the upper extremity thereof, and a shoulder 20, formed at the bases of the cut out portions 19, which shoulder forms a support for the arrow 21 that indicates the movements of the steering post associated therewith.

Figure 5:
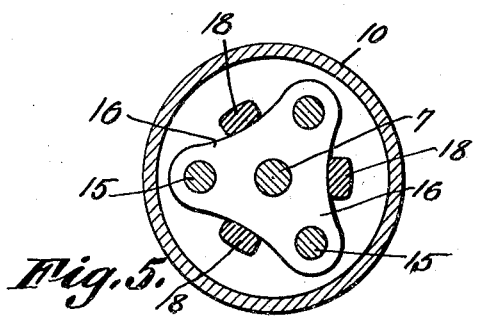
Figure 5 is a sectional view taken on line 5—5 of Figure 1.
Figure 6:
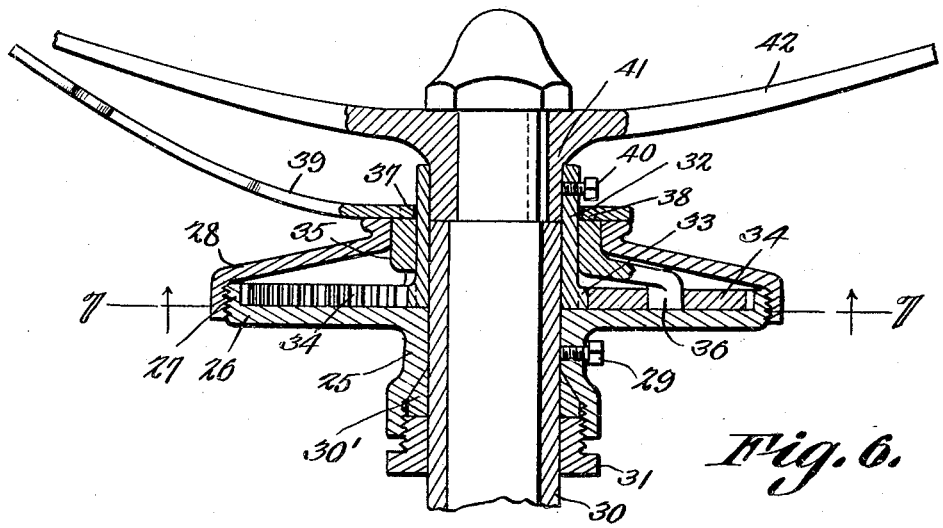
Figure 6 is a fragmental sectional view of the upper portion of a steering gear disclosing a modified form of the invention.
Figure 7:
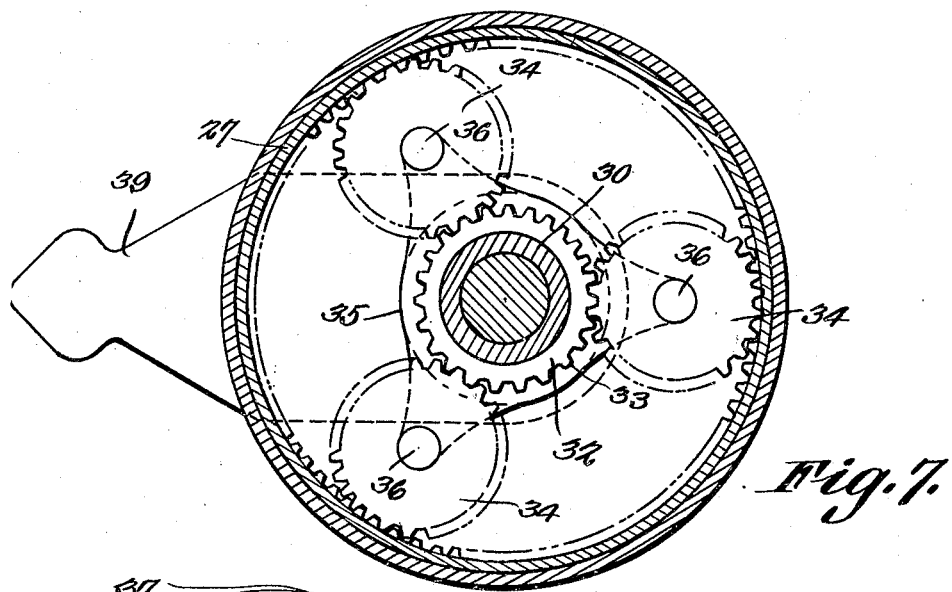
Figure 7 is a sectional view taken on line 7—7 of Figure 6.
Figure 8:
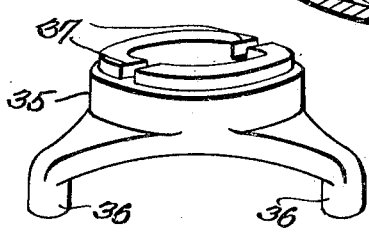
Figure 8 is a perspective view of the means employed for connecting the indicating dial with the steering mechanism.

This arrow 21 is formed perferably of sheet metal and is provided with a central opening to permit the positioning of the arrow over the shaft 8. Extending from the wall of the opening are fingers 22 that are adapted to move in the cut out portions 19 to lock the arrow 21 to the collar 17 so that movement of the collar will result in a relative movement of the arrow 21. As illustrated by Figure 5 of the drawings, the fingers 18 lie adjacent to the member 16 at points between the pinions 14 in a manner to cause a rotary movement of the fingers and collar 17 when the supporting member 16 is rotated.

Positioned on the upper end of the shaft 8 is the usual steering wheel 23 which is keyed to the shaft 8 at 24. From the foregoing it will be obvious that due to the construction as shown and described, the arrow will be gradually moved under the steering wheel when the steering wheel is rotated to accomplish the steering of the vehicle, the connection between the arrow and steering gear providing for the accurate moving of the arrow to positions corresponding with the positions taken by the front wheels of the vehicle.

In Sheet 2 of the drawings, a modified form of the invention is illustrated disclosing a structure especially designed for positioning on steering gears embodying steering columns wherein the upper portion thereof is not enlarged, and to this end, a collar 25 is provided which is formed with an enlarged portion 26 provided with an upstanding flange 27 having threads to cooperate with threads of the cap designed to house the gearing to be hereinafter more fully described.

A set screw indicated at 29 extends through the collar 25 to secure the collar to the steering column 30 associated therewith, a threaded collar 31 being provided to cooperate with the collar 25 in supporting packing member 30', and further secure the collar 25 to the steering column, and prevent oil from passing from the operating mechanism along the steering column.

Mounted on the upper extremity of the steering column 30 is a sleeve 32 that has teeth 33 extending outwardly from the lower end thereof, which teeth mesh with the teeth of the gears 34 that are carried by the supporting member 35 which as shown, is formed with downwardly extended shafts 36 that are positioned in openings formed in the gears 34, to support the gears for rotation.

Notches 37 are provided in the upper end of the supporting member 35 and are adapted to receive fingers 38 extending from the body portion of the arrow 39 whereupon the arrow is locked to the supporting member 35 to move therewith. A set screw 40 secures the sleeve 32 to the hub 41 of the steering wheel 42 so that rotary movement of the hub 41 may be imparted to the sleeve 32 to rotate the same and cause the operation of the gears 34 which in turn move the supporting member 35. It follows that as the member 35 is moved, the arrow 39 is correspondingly moved, indicating the position of the front wheels.

I claim:—

1. In a device of the character described, a housing disposed adjacent to the upper extremity of the steering column of a motor vehicle, a steering post extending through the steering column, a supporting member disposed within the housing, and formed integral with the steering post gearing mounted on the supporting member, a steering wheel positioned above the housing, said gearing adapted to transmit movement from the steering wheel to the steering post, a sleeve having fingers adapted to embrace portions of the supporting member to receive movement therefrom, and an indicating member movable with the sleeve.

2. In a device of the character described, a steering column having a housing at its upper end, a steering post having a supporting member formed at its upper end and positioned within the housing, a steering wheel, a relatively short shaft for supporting the steering wheel, means for transmitting movement of the relatively short shaft to the steering post, an indicator positioned between the steering wheel and housing, and means extending into the housing and engaging the supporting member and supporting the indicating member for moving the indicating member with the steering post.

3. In a device of the character described, a steering column having a housing at its upper end, a steering post extending into the housing, a steering wheel positioned above the housing, means disposed within the housing for transmitting movement of the steering wheel to the steering post, a sleeve disposed within the housing, means for connecting the sleeve with the steering post to cause a relative movement of the sleeve, and an indicating member supported by the sleeve to move therewith.

4. In a device of the character described, a steering column having a housing at its upper end, a steering post having a supporting member formed integral therewith and extending into the housing, a shaft carrying a wheel at one end and extending into the housing, a supporting member at the lower end of the shaft, gearing supported by the supporting member to transmit rotary movement of the shaft to the steering post, a sleeve having depending fingers positioned within the housing, said fingers adapted to grip the supporting member to receive motion therefrom, and an indicating member supported on the sleeve to rotate therewith.

In testimony that I claim the foregoing as my own, I have hereto affixed my signature in the presence of a witness.

ABIRAM J. SLONECKER.

Witness:
I. E. SIMPSON.